United States Patent

Kawamura et al.

[11] 4,221,709
[45] Sep. 9, 1980

[54] AZO PIGMENTS

[75] Inventors: Kimihide Kawamura, Koshigaya; Shojiro Horiguchi, Hoya, both of Japan

[73] Assignee: Dainichiseika Color & Chemicals Mfg. Co., Ltd., Tokyo, Japan

[21] Appl. No.: 1,835

[22] Filed: Jan. 8, 1979

[30] Foreign Application Priority Data

Apr. 27, 1978 [JP] Japan ................... 53/49232

[51] Int. Cl.² ............................................ C09B 31/14
[52] U.S. Cl. .................... 260/165; 260/162; 260/157; 260/164
[58] Field of Search ................ 260/165, 162, 164, 157

[56] References Cited

U.S. PATENT DOCUMENTS

| 3,953,420 | 4/1976 | Dimroth et al. | 260/165 X |
| 3,956,267 | 5/1976 | Sommer et al. | 260/165 |
| 4,043,999 | 8/1977 | Model et al. | 260/165 X |

Primary Examiner—Paul F. Shaver
Attorney, Agent, or Firm—Oblon, Fisher, Spivak, McClelland & Maier

[57] ABSTRACT

Azo pigments having the formula

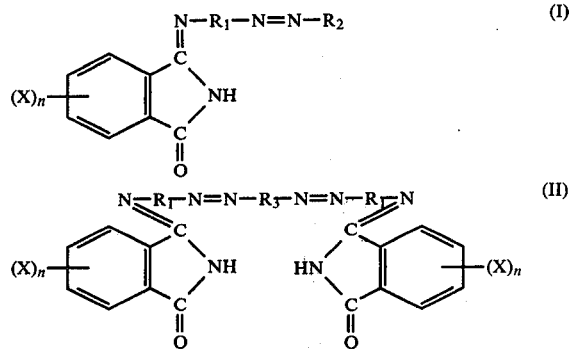

wherein X represents hydrogen or halogen atom; n represents an integer of 1 to 4; $R_1$ represents a substituted or unsubstituted aromatic group; $R_2$ represents a moiety of a coupling component which has one coupling site and $R_3$ represents a moiety of a coupling component which has two coupling sites.

The azo pigments can be produced by coupling a coupling component with a diazonium compound of an aromatic amine having the formula

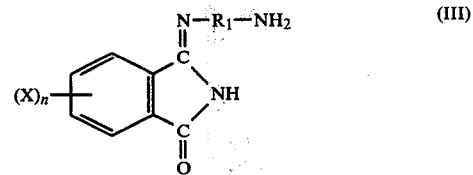

wherein X, n and $R_1$ are defined above.

10 Claims, No Drawings

AZO PIGMENTS

BACKGROUND OF THE INVENTION

1. Field of the Invention

The present invention relates to novel azo pigments and process for producing the same. More particularly, it relates to novel azo pigments which have excellent solvent resistance, heat resistance and tinting strength.

2. Description of the Prior Arts

Heretofore, many azo pigments have been known and have been used for various usages. However, azo pigments having satisfactory characteristics have not been obtained.

The inventors have studied on azo pigments which have improved various fastnesses especially improved weather-proofing property, and solvent resistance.

SUMMARY OF THE INVENTION

It is an object of the present invention to provide novel azo pigments which have improved various fastnesses especially improved weather-proofing property and solvent resistance.

It is another object of the present invention to provide a process for producing azo pigments which have improved various fastnesses.

The foregoing and other objects of the present invention have been attained by providing azo pigments having the formula

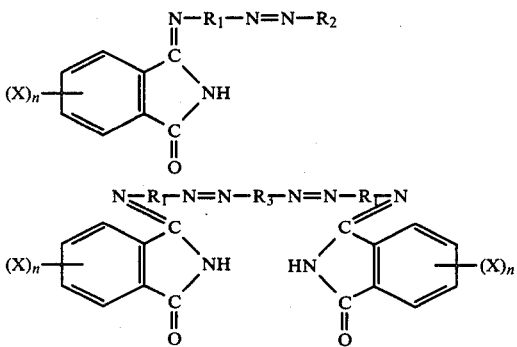

wherein X represents hydrogen or halogen atom; n represents an integer of 1 to 4; $R_1$ represents a substituted or unsubstituted aromatic group; $R_2$ represents a moiety of a coupling component which has one coupling site and $R_3$ represents a moiety of a coupling component which has two coupling site.

The azo pigments can be produced by coupling a coupling component with a diazonium compound of an aromatic amine having the formula

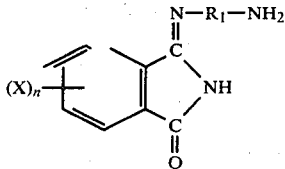

wherein X, n and $R_1$ are defined above.

DETAILED DESCRIPTION OF THE PREFERRED EMBODIMENTS

The aromatic amines having the formula (III) used in the process of the present invention have been known. (Japanese Patent Publication No. 24561/1974)

For example, the aromatic amines (III) can be easily produced by condensing 3-imino-1-oxoisoindoline derivative or 3,3-dichloro-1-oxoisoindoline with an aromatic diamine in a solvent.

Suitable aromatic diamines include phenylenediamine, diaminodiphenyl, diaminostilbene, diamineanthraquinone, diaminonaphthalene, diaminodiphenylalkane, diaminofluorene, diaminopyridine, diaminocarbazole, diaminobenzothiazole, bis(4-aminophenyl) oxazole, 2-(4-aminophenyl)-6-aminobenzothiazole, 2,5-bis(3-methyl-4-aminophenyl) oxadiazole, 2,5-bis(4-aminophenyl) thiadiazole or 2,5-bis(3-chloro-4-aminophenyl) thiadiazole and substituents thereof.

The coupling components used in the present invention can be the known ones. For example, suitable couplers having one coupling site include acetoacetanilide, o-chloroacetoacetanilide, p-chloroacetoacetanilide, 4-chloro-2,5-dimethoxyacetoacetanilide, 2,4-dimethoxyacetoacetanilide, o-acetoacetanisidide, o-acetoacetotoluidide, 2,4-acetoacetoxylidide, p-acetoacetanisidide, p-acetoacetotoluidide, 4-chloro-2-methyl-acetoacetanilide, p-ethoxyacetoacetanilide, 4-nitro-2-methylacetoacetanilide, 4-acetoacetoaminophthalimide, 5-acetoacetoaminobenzimidazolone, 4-benzoylamino-2,5-diethoxyacetoacetanilide, 4-acetylaminoacetanilide, β-naphthol, 3-hydroxy-2-naphthanilide, 4'-chloro-3-hydroxy-2-naphthanilide, 3'-chloro-3-hydroxy-2-naphthanilide, 3-hydroxy-3'-nitro-2-naphthanilide, 3-hydroxy-4'-nitro-2-naphthanilide, 3-hydroxy-2-naphtho-o-toluidide, 3-hydroxy-2-naphtho-p-toluidide, 4'-chloro-3-hydroxy-2-naphtho-o-toluidide, 5'-chloro-3-hydroxy-2-naphtho-o-toluidide, 3-hydroxy-2-naphtho-2,4-xylidide, 5'-chloro-3-hydroxy-2-naphtho-o-anisidide, 5'-bromo-3-hydroxy-2-naphtho-o-anisidide, 3-hydroxy-2-naphtho-p-anisidide, 3-hydroxy-2'-methyl-2-naphtho-p-anisidide, 3-hydroxy-2',5'-dimethoxy-2-naphthanilide, 5'-chloro-3-hydroxy-2',4'-dimethoxy-2-naphthanilide, 4'-chloro-3-hydroxy-2',5'-dimethoxy-2-naphthanilide, 3-hydroxy-2-naphtho-o-phenetitide, 3-hydroxy-2-naphtho-p-phenetidide, 3-hydroxy-N-1-naphthyl-2-naphthamide, 3-hydroxy-N-2-naphthyl-2-naphthamide, 3-hydroxy-2-o-anthratoluidide, 4'-chloro-2-hydroxy-3-carbazolcarboxyanilide, 2-hydroxy-2',5'-dimethoxy-3-dibenzofurancarboxyanilide, N-[m-(3-methyl-5-oxo-2-pyrazolone-1-yl)phenylsulfonyl]anthranilic acid, 3-methyl-1-(o-chloro-6-sulfophenyl)-5-pyrazolone, 3-methyl-1-(4-sulfo-6-chlorophenyl)-5-pyrazolone, 3-methyl-1-(3-sulfo-6-chlorophenyl)-5-pyrazolone, 3-methyl-1-(4-chloro-6-sulfo)-5-pyrazolone, 3-methyl-1-(3,6-dichloro-4-sulfo)-5-pyrazolone, 3-methyl-1-(o-, m- or p-sulfophenyl)-5-pyrazolone, 3-phenyl-1-(o-sulfophenyl)-5-pyrazolone, 3-methyl-1-(2,5,6-trichloro-3-sulfophenyl)-5-pyrazolone, 3-methyl-1-phenyl-5-pyrazolone, 3-carboamide-1-phenyl-5-pyrazolone, 3-carboxy-1-(m-aminophenyl)-5-pyrazolone, 3-carboxy-1-(2-chloro-4-sulfo-6-methylphenyl)-5- pyrazolone, 3-carboxyethyl-1-(2-chloro-4-sulfo-6-methylphenyl)-5-pyrazolone, 3-carboxy-1-(3,6-disulfophenyl)-5-pyrazolone, 1-[m-(m-nitrobenzamide)-phenyl]-5-oxo-2-pyrazolone-3-carboxylic acid, 3-carboxy-1-(m-nitrophenyl)-5-pyrazolone, 3-carboxy-1-phenyl-5-pyrazolone, 3-carboxyethyl-1-phenyl-5-pyrazolone, 3-carboxy-1-(o-sulfophenyl)-5-pyrazolone, 3-carboxy-1-(p-sulfophenyl)-5-pyrazolone, 3-carboxyethyl-1-(p-sulfophenyl)-5-pyrazolone, 3-carboxyethyl-1-(4-sulfo-6-methylphenyl)-5-pyrazolone, 1-(m-chlorophenyl)-3-methyl-5-pyrazolone, 3-methyl-1-(m-nitrophehyl)-5-pyrazolone, 3-methyl-1-(p-nitrophenyl)-5-pyrazolone, 3-methyl-1-phenyl-5-pyrazolone and 3-methyl-1-(p-toluyl)-5-pyrazolone.

Coupling components having two coupling sites can be produced by condensing 1 mole of a diamine having the formula $$H_2N-A-NH_2 \quad (a)$$

wherein A represents an aromatic group or a heterocyclic group with 2 moles of a carboxylic acid or carboxylic acid derivative which has the formula $$B-COY \quad (b)$$

wherein B represents a moiety of a coupling component having phenolic hydroxy group or a moiety of a coupling component having active methylene group; and Y represents hydroxy group, halogen atom or a moiety of an ester, by a conventional process.

Suitable diamines having the formula (a) include phenylenediamine, diaminodiphenyl, diaminodiphenyl ether, diaminodiphenylsulfone, diaminodiphenylketone, diaminodiphenylmethane, diaminodibenzyl, diaminostilbene, diaminochrysene, diaminonaphthalene, diaminopyridine, diaminobenzthiazole, 2,5-bis-(4'-aminophenyl)oxadiazole, diaminodiphenylurea, diaminofluorene, diaminodiphenyleneoxide, diaminodiphenylenesulfone, diaminoanthraquinone, diaminopyrimidine and substitutents thereof.

Suitable carboxylic acids having the formula (b) include 2-hydroxy-3-naphoic acid, 2-hydroxyanthracene-3-carboxylic acid, 3-hydroxybenzofuran-2-carboxylic acid, 2-hydroxycarbazole-3-carboxylic acid, 2-hydroxy-α-benzocarbazole-3-carboxylic acid, 1-(p-carboxyphenyl)-3-methyl-5-pyrazolone, 1-phenyl-3-carboxy-5-pyrazolone, 1-(o-chlorophenyl)-3-carboxy-5-pyrazolone, p-carboxyacetoacetanilide and m-carboxy-p-chloroacetoacetanilide.

Suitable coupling components having more than 2 coupling sites include 4,4'-bis-acetoacetylamino-3,3'-dimethyldiphenyl, 4,4'-bis-acetoacetylamino-3,3'-dimethoxydiphenyl, 4,4'-bis-acetoactylamino-1,1'-diphenylmethane, 4,4'-bis-acetoacetylamino-3,3'-dichlorodiphenyl, 4,4'-bis-acetoacetylaminodiphenyl ether, 1,5-bis-acetoacetylamino-naphthalene, 2,5-bis-acetoacetylamino-1,4-dimethylbenzene, 1,4-bis-acetoacetylamino-2,5-dichlorobenzene, 2-chloro-1,4-bis-acetoacetylaminobenzene, 2-methoxy-1,4-bis-acetoacetylaminobenzene, 2,5-dimethoxy-1,4-bis-acetoacetylaminobenzene, 2-methoxy-5-chloro-1,4-bis-acetoacetylaminobenzene, 2-methyl-5-chloro-1,4-bis-acetoacetylaminobenzene and 1,4-diacetoacetylamino-2,5-dimethylbenzene and compounds having the formula

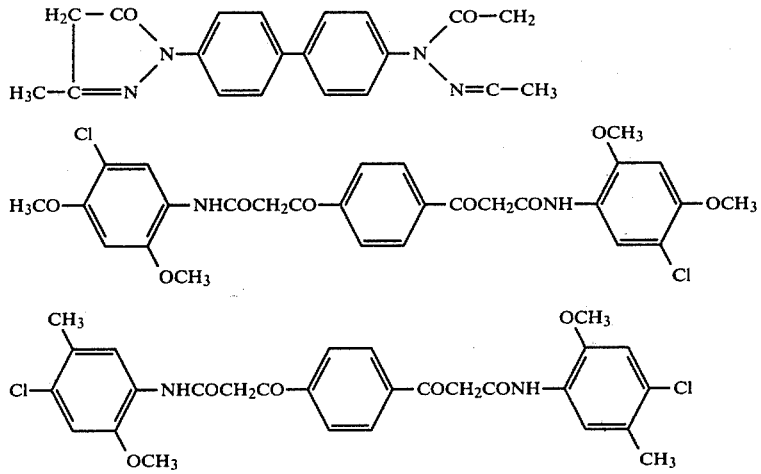

In the process of the present invention, the azo pigments can be produced by coupling a coupling component with a diazonium compound of an aromatic amine having the formula (III) in accordance with the conventional coupling process for producing azo pigments.

The processes for producing the azo pigments of the present invention can be classified as follows.

(1) An aromatic amine having the formula (III) is reacted with a nitrous acid in water, an organic solvent or a mixture thereof to obtain a diazonium salt.

On the other hand, a coupling component was dissolved or dispersed in water, an organic solvent or a mixture thereof to prepare a solution of a coupler.

The diazonium salt is added to the solution of a coupler or the solution of a coupler is added to the diazonium salt whereby a coupling reaction is conducted to obtain the azo pigment.

(2) An aromatic amine having the formula (III) and a coupling component are added and mixed in water, an organic solvent or a mixture thereof, and then, a nitrous acid source of a mixture of sodium nitrite and an acid such as hydrochloric acid or acetic acid whereby a diazotation and a coupling reaction are simultaneously conducted to obtain the azo pigment.

In the diazotation, it is preferable to incorporate the aromatic amine having the formula (III) at a concentration of about 1 to 10 wt.%.

On the other hand, it is preferable to incorporate the coupling component at a concentration of about 0.5 to 10 wt.%.

The diazotation should be conducted under weak acidic to strong acidic condition. In the coupling reaction, the optimum pH can be considered depending upon a kind of the coupling component.

That is, when water or a mixture of water and an organic solvent is used as a medium, pH in the reaction system for the coupling reaction is preferably about 4 to 7 in a case of an anilide type coupling component, and about 7 to 14 in a case of a naphthol type coupling component and about 4 to 10 in a case of pyrazolone type coupling component.

The medium used in the coupling reaction can be water, an organic solvent or a mixture thereof.

The reaction system can be selected depending upon a kind of the coupling component.

When the aromatic amine having the formula (III) and the coupling component are relatively compounds having lower molecular weight, the medium is not limited though water is economical.

When either or both of the aromatic amine (III) and the coupling component, is a compound having relatively higher molecular weight, it is preferable to use an organic solvent as the medium.

The condition for the coupling reaction is depending upon the raw materials and the coupling reaction is usually conducted at about 0° to 50° C. for about 1 to 10 hours.

When the reaction medium is water or a mixture of water and an organic solvent, the coupling reaction velocity is relatively fast whereby it is preferable to conduct the coupling reaction at relatively low temperature. On the contrary, it is preferable to conduct the coupling reaction in an organic solvent at relatively high temperature.

In the reaction system, suitable organic solvents include acetic acid, propionic acid, benzene, toluene, xylene, nitrobenzene, chlorobenzene, dichlorobenzene and trichlorobenzene.

The following azo pigments are typical azo pigments of the present invention.

Azo pigments having the formula (I) wherein $R_2$ is a moiety of a coupling component having the formula

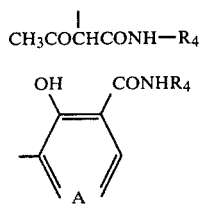

-continued
or

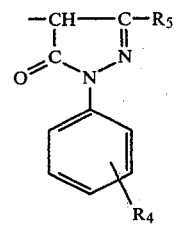

wherein $R_4$ represents phenyl, phthalimido or benzimidazolone group which can be substituted with a halogen atom, methyl, methoxy, ethoxy, nitro, carbamido, phenylcarbamoyl or acetylamino group and $R_5$ represents methyl, ethyl, carbomethoxy, carboethoxy or carbamido group.

Azo pigments having the formula (II) wherein $R_3$ is a moiety of a coupling component having the formula

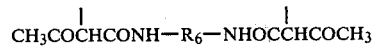

or

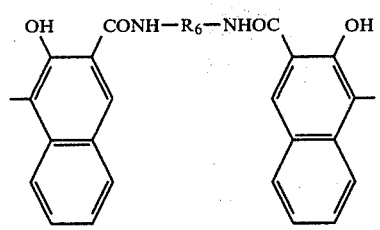

wherein $R_6$ represents a phenylene, biphenylene or naphthylene group which can be substituted with a halogen atom, methyl, methoxy or ethoxy group.

The azo pigments obtained by the process of the present invention have excellent solvent resistance and also have high light fastness, heat resistance, water resistance, acid resistance, and base resistance and also significantly high tinting strength. The azo pigments are practically used as pigment in high efficiency.

The invention will be further illustrated by certain examples which are provided for purposes of illustration only and are not intended to be limiting in any manner.

In the examples the term of parts means parts by weight.

EXAMPLE 1

3.75 Parts of 3-(4-aminophenylimino)-1-oxo-4,5,6,7-tetrachloroisoindoline was suspended in 11.3 parts of glacial acetic acid and then, 3.7 parts of conc. hydrochloric acid was added and the mixture was stirred and 2.6 parts of water was added and the mixture was kept at 0° to 5° C. and 2.0 parts of 40% aqueous solution of sodium nitrite was added. The mixture was stirred at the same temperature for about 30 minutes to obtain a yellow diazonium salt.

On the other hand, 1.8 parts of acetoacetanilide was added to an aqueous solution of 80 parts of water and 0.4 part of sodium hydroxide to dissolve it with stirring and then, 4.75 parts of sodium acetate trihydrate was added and 0.7 part of acetic acid was added to obtain an acetic acid acidic suspension.

Said solution of diazonium salt was added dropwise to the acidic suspension and a coupling reaction was conducted to obtain 4.6 parts of a brilliant orange azo pigment having the formula

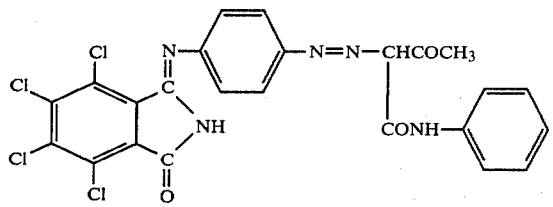

Various test results of characteristics of the resulting pigment and the conventional pigment (Hansa Yellow G: C. I. 11680) are shown in Table 2.

EXAMPLE 2

4.24 Parts of 3-(2-methyl-4-amino-5-chlorophenylimino)-1-oxo-4,5,6,7-tetrachloroisoindoline was suspended into 12.7 parts of glacial acetic acid and then, 3.7 parts of conc. hydrochloric acid was added and the mixture was stirred, and then, 2.6 parts of water was added and the mixture was kept at 0° to 5° C. and 2.0 parts of 40% aqueous solution of sodium nitrite was added. The mixture was stirred at the same temperature for about 1 hour to obtain a pale yellow diazonium salt.

On the other hand, 4.1 parts of acetoaceto-m-xylidide was added to a solution of 88 parts of methanol and 0.4 part of sodium hydroxide to dissolve it with stirring and then, 4.75 parts of sodium acetate trihydrate was added to obtain an acetic acid acidic methanol suspension.

Said solution of diazonium salt was added dropwise to the acidic suspension to conduct a coupling reaction.

The resulting crude azo pigment was pigmentized from o-dichlorobenzene to obtain an orange azo pigment having the formula

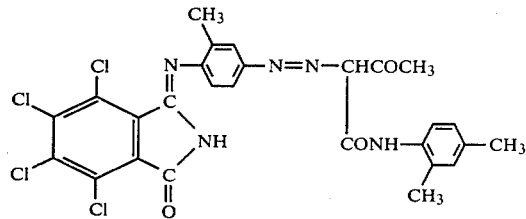

Various test results of characteristics of the resulting pigment and the known pigment (Hansa Yellow A: C.I. 11735) are shown in Table 2.

EXAMPLE 3

3.8 Parts of 3-(4-aminophenylimino)-1-oxo-4,5,6,7-tetrachloroisoindoline was added to a mixture of 30.0 parts of conc. hydrochloric acid and 3.0 parts of glacial acetic acid the mixture was stirred, and the mixture was kept at 0° to 5° C. and 8.0 parts of 10% aqueous solution of sodium nitrite was added and the mixture was stirred at the same temperature for 1 hour to obtain a yellow diazonium salt.

On the other hand, 2.8 parts of 2,5-dimethoxy-4-chloroacetoacetanilide was dissolved into an aqueous solution of 200 parts of water and 1.0 part of sodium hydroxide and then, 38.5 parts of sodium acetate was added to obtain an acetic acid acidic suspension.

Said aqueous solution of diazonium salt was added dropwise to the resulting acidic suspension to conduct a coupling reaction.

The resulting crude pigment of o-dichlorobenzene was pigmentized from o-dichlorobenzene to obtain a reddish orange azo pigment having the formula

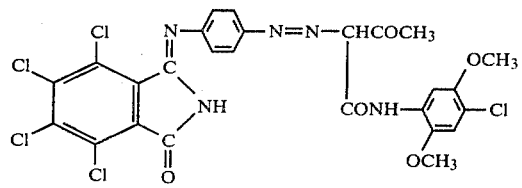

Various test results of characteristics of the resulting pigment and the known pigment are shown in Table 2.

EXAMPLE 4

4.2 Parts of 3-(2-methyl-4-amino-5-chlorophenylimino)-1-oxo-4,5,6,7-tetrachloroindoline was suspended into nitrobenzene and then, 8.0 parts of conc. hydrochloric acid and 8.0 parts of glacial acetic acid were added and the mixture was kept at 10° C. and then, 2 parts of 40% aqueous solution of sodium nitrite was added and the mixture was stirred at 1 hour at the same temperature to obtain a suspension of a pale yellow diazonium salt, and then, 2.1 parts of 2,4-dimethylacetoacetanilide was added to the suspension and the mixture was stirred at 20° C. to conduct a coupling reaction.

The resulting crude azo pigment was pigmentized to obtain the azo pigment which is the same with that of Example 1.

Various test results of characteristics of the resulting pigment and the known pigment are shown in Table 2.

EXAMPLES 5 TO 31

In accordance with the process of Examples 1 to 4 except using the compound having the formula (III) and the known coupling components, various azo pigments shown in Table 1 were prepared. The colors of the resulting azo pigments are shown in Table 1.

TABLE 1

| Example | Compound (III) | Coupling component | Color |
|---|---|---|---|
| 5 | 3-(4-aminophenylimino)-1-oxo-4,5,6,7-tetrachloroisoindoline | 2-chloroacetoacetanilide | reddish yellow |
| 6 | 3-(4-aminophenylimino)-1-oxo-4,5,6,7-tetrachloroisoindoline | 2-methoxyacetoacetanilide | reddish yellow |
| 7 | 3-(4-aminophenylimino)-1-oxo-4,5,6,7-tetrachloroisoindoline | 2,4-dimethoxyacetoacetanilide | orange |
| 8 | 3-(4-aminophenylimino)-1-oxo-4,5,6,7-tetrachloroisoindoline | 4-acetoacetylaminophthalimide | reddish yellow |

TABLE 1-continued

| Example | Compound (III) | Coupling component | Color |
|---|---|---|---|
| 9 | 3-(4-aminophenyl-imino)-1-oxo-4,5,6,7-tetrachloroisoindoline | 5-acetoacetylamino-benzimidazolone | brown |
| 10 | 3-(4-aminophenyl-imino)-1-oxo-4,5,6,7-tetrachloroisoindoline | 2,5-diethoxy-4-phenylcarbamoyl-acetoacetanilide | brown |
| 11 | 3-(4-aminophenyl-imino)-1-oxo-4,5,6,7-tetrachloroisoindoline | 4-acetylaminoaceto-acetanilide | yellowish red |
| 12 | 3-(4-aminophenyl-imino)-1-oxo-4,5,6,7-tetrachloroisoindoline | 2,4-dimethylaceto-acetanilide | orange |
| 13 | 3-(3-aminophenyl-imio)-1-oxo-4,5,6,7-tetrachloroisoindoline | 2-methylaceto-acetanilide | yellow |
| 14 | 3-(3-aminophenyl-imio)-1-oxo-4,5,6,7-tetrachloroisoindoline | 4-chloro-2,5-dimethoxyaceto-acetanilide | orange |
| 15 | 3-(4-amino-3-chloro-phenylimino)-1-oxo-4,5,6,7-tetrachloro-isoindoline | 2-chloroaceto-acetanilide | reddish yellow |
| 16 | 3-(4-amino-3-nitro-phenylimino)-1-oxo-4,5,6,7-tetrachloro-isoindoline | 2-chloroaceto-acetanilide | yellow |
| 17 | 3-(4-amino-3-nitro-phenylimino-1-oxo-4,5,6,7-tetrachloro-isoindoline | 2,4-dimethylaceto-acetanilide | yellow |
| 18 | 3-(4-amino-3-nitro-phenylimino)-1-oxo-4,5,6,7-tetrachloro-isoindoline | 5-acetoacetylamino-benzimidazolone | brown |
| 19 | 3-(4-amino-3-nitro-phenylimino-1-oxo-4,5,6,7-tetrachloro-isoindoline | 4-acetoacetylamino-phthalimide | yellow |
| 20 | 3-(4-amino-3-nitro-phenylimino)-1-oxo-4,5,6,7-tetrachloro-isoindoline | 4-chloro-2,5-dimethoxyaceto-acetanilide | brown |
| 21 | 3-(4-amino-3-chloro-6-methylphenylimino)-1-oxo-4,5,6,7-tetra chloroisoindoline | 2-chloroaceto-acetanilide | reddish yellow |
| 22 | 3-(4-amino-3-chloro-6,methylphenylimino)-1-oxo-4,5,6,7-tetra-chloroisoindoline | 2,5-dimethoxy-4-(phenylcarbamoyl)acetoacetanilide | brown |
| 23 | 3-(4-amino-3-chloro-6-methylphenylimino)-1-oxo-4,5,6,7-tetra-chloroisoindoline | 4-ethoxyacetoacet-anilide | orange |
| 24 | 6-methylphenylimino)-1-oxo-4,5,6,7-tetra-chloroisoindoline | acetanilide | yellow |
| 25 | 3-(4-amino-3-chloro-6-methylphenylimino)-1-oxo-4,5,6,7-tetra-chloroisoindoline | 5-acetoacetylamino-benzimidazolone | brownish orange |
| 26 | 3-(4-amino-3-chloro-6-methylphenylimino)-1-oxo-4,5,6,7-tetra-chloroisoindoline | 4-chloro-2,5-dimethoxyaceto-acetanilide | orange |
| 27 | 3-(4-amino-2-methyl-phenylimino)-1-oxo-4,5,6,7-tetrachloro-isoindoline | 5-acetoacetylamino-benzimidazolone | brownish orange |
| 28 | 3-(4-amino-2-methyl-phenylimino)-1-oxo-4,5,6,7-tetrachloro-isoindoline | acetoacetanilide | orange |
| 29 | 3-(4-amino-2-methyl-phenylimino)-1-oxo-4,5,6,7-tetrachloro-isoindoline | 2-chloroaceto-acetanilide | orange |
| 30 | 3-(4-amino-2-methyl-phenylimino)-1-oxo-4,5,6,7-tetrachloro-isoindoline | 2,4-dimethylaceto-acetanilide | red |
| 31 | 3-(4-amino-3-methyl-phenylimino)-1-oxo-4,5,6,7-tetrachloro-isoindoline | 4-chloro-2,5-dimethoxy-acetoacetanilide | yellowish red |

Various characteristics of the azo pigments obtained in Examples 1 to 10 and the conventional azo pigments A and B having the similar structure have been compared. The results are shown in Table 2.

Characteristics of the azo pigments obtained in Examples 11 to 31 are similar to those of Examples 1 to 10.

TABLE 2

| Example | Tinting strength | | | Solvent resistance | | | Weatherproofing property | | |
|---|---|---|---|---|---|---|---|---|---|
| | Invent. | Ref. A | Ref. B | Invent. | Ref. A | Ref. B | Invent. | Ref. A | Ref. B |
| 1 | ⊚ | ○ | ○ | ⊚ | X | X | ⊚ | X | X |
| 2 | ⊚ | ○ | ○ | ⊚ | X | X | ⊚ | X | X |
| 3 | ⊚ | ○ | ○ | ⊚ | X | X | ⊚ | X | X |
| 4 | ⊚ | ○ | ○ | ⊚ | X | X | ⊚ | X | X |
| 5 | ⊚ | ○ | ○ | ⊚ | X | X | ⊚ | X | X |
| 6 | ⊚ | ○ | ○ | ⊚ | X | X | ⊚ | X | X |
| 7 | ⊚ | ○ | ○ | ⊚ | X | X | ⊚ | X | X |
| 8 | ⊚ | ○ | ○ | ⊚ | X | X | ⊚ | X | X |
| 9 | ⊚ | ○ | ○ | ⊚ | X | X | ⊚ | X | X |
| 10 | ⊚ | ○ | ○ | ⊚ | X | X | ⊚ | X | X |

Note:
Ref. A: Hansa Yellow G. C.I. 11680
Ref. B: Hansa Yellow A. C.I. 11735
⊚ Excellent
○ Fair
X Inferior

EXAMPLE 32

4.24 Parts of 3-(2-methyl-4-amino-5-chloro-phenylimino)-1-oxo-4,5,6,7-tetrachloroisoindoline was suspended in 12.7 parts of glacial acetic acid and then 3.7 parts of conc. hydrochloric acid was added and the mixture was stirred and 2.6 parts of water was added and the mixture was kept at 0° to 5° C. and 2.0 parts of 40% aqueous solution of sodium nitrite was added. The mixture was stirred at the same temperature for about 1 hour to obtain a pale yellow diazonium salt and then, 4.7 parts of sodium acetate trihydrate was added to the diazonium salt to obtain a solution of di-azonium salt.

On the other hand, 2.7 parts of 3-hydroxy-2-naphthol-o-anisidide was dissolved in 100 parts of 5% aqueous solution of sodium hydroxide and the mixture was kept at 10° C. and was added dropwise to the diazonium salt and a coupling reaction was conducted to obtain a reddish blue azo pigment having the following formula

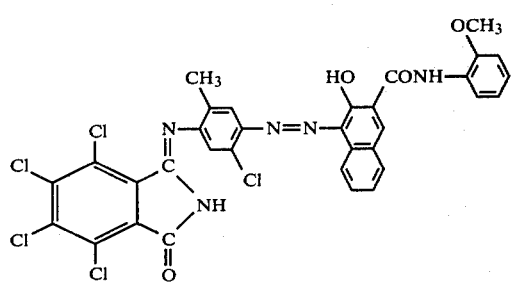

EXAMPLE 33

3.3 Parts of 3-(2,5-dimethyl-4-aminophenylimino)-1-oxo-4,7-dichloroisoindoline was suspended in 10 parts of glacial acetic acid and then, 3.7 parts of conc. hydrochloric acid was added and the mixture was stirred and 2.6 parts of water was added and the mixture was kept at 0° to 5° C. and 2.0 parts of 40% aqueous solution of sodium nitrite was added. The mixture was stirred at the same temperature for 30 minutes to obtain a yellow diazonium salt and then, 4.7 parts of sodium acetate trihydrate was added to obtain a solution of diazonium salt.

On the other hand, 2.7 parts of 3-hydroxy-2-naphthol-4'-anisidide was dissolved into 100 parts of 5% aqueous solution of sodium hydroxide and the mixture was kept at 10° C. and added dropwise to the solution of diazonium salt and a coupling reaction was conducted to obtain a reddish blue azo pigment having the formula

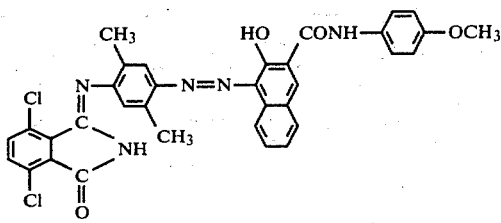

EXAMPLE 34

5.0 Parts of a diazonamino compound (produced by reacting piperidine with a diazonium salt of 3-(3-methoxy-4-aminophenylimino)-1-oxo-4,5,6,7-tetrachloroisoindoline in an alkaline medium) which has the formula

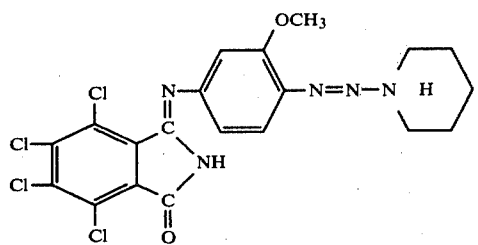

and 3.3 parts of 4-(2'-hydroxy-3'-naphthoylamino)-2,5-dimethyl-1-benzylaminobenzene were suspended in 250 parts of o-dichlorobenzene and the mixture was heated to 70° to 75° C. and 20 parts of glacial acetic acid was added. The mixture was stirred at 120° to 130° C. for 2 hours to decompose the diazoamino compound and a coupling reaction was conducted to obtain a reddish blue azo pigment having the formula

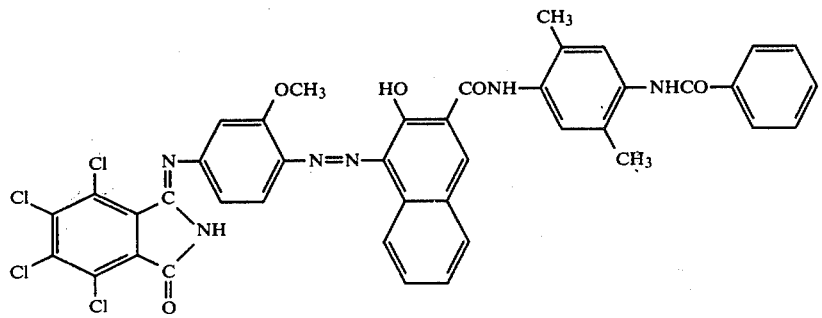

EXAMPLE 35

3.75 Parts of 3-(4-aminophenylimino)-1-oxo-4,5,6,7-tetrachloroisoindoline was dissolved in 37.5 parts of dimethylformamide and 3.4 parts of conc. hydrochloric acid was added and the mixture was stirred and kept at 0° to 2.0 parts of 40% aqueous solution of sodium nitrite was added. The mixture was stirred at the same temperature for about 1 hour to obtain a pale yellow diazonium salt.

On the other hand, 3.6 parts of 3-hydroxy-2-naphthol-2',4'-dimethoxy-5'-chloroanilide was dissolved into 72 parts of dimethylformamide and then, 4.3 parts of sodium acetate trihydrate was added. The mixture was kept at 10° C. and the solution of the diazonium salt was added dropwise to the mixture and a coupling reaction was conducted to obtain a reddish violet azo pigment having the formula.

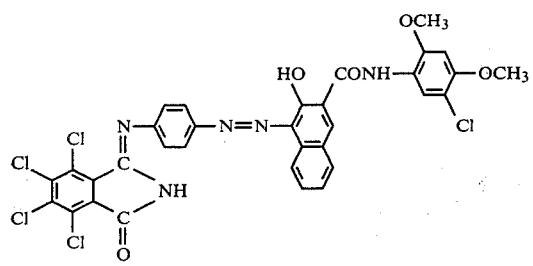

EXAMPLES 36 TO 56

In accordance with the process of Examples 32 to 35 except using the compound having the formula (III) and the known coupling components various azo pigments shown in Table 3 were prepared.

TABLE 3

| Example | Compound (III) | Coupling component | Color |
|---|---|---|---|
| 36 | 3-(2-methyl-5-methoxy-4-aminophenylimino)-1-oxo-4,7-dichloroisoindoline | β-naphthol | red |
| 37 | 3-(2-methyl-5-methoxy-4-aminophenylimino)-1-oxo-4,7-dichloroisoindoline | 3-hydroxy-2-naphtho-o-phenetidide | reddish purple |
| 38 | 3-(2-methyl-5-methoxy-4-aminophenylimino)-1-oxo-4,7-dichloroisoindoline | 3-hydroxy-2-naphtho-m-xylidide | reddish purple |
| 39 | 3-(2-methyl-5-chloro-4-aminophenylimino)-1-oxo-4,5,6,7-tetrachloroisoindoline | 3-hydroxy-2-naphtho-o-anisidide | bordeaux |
| 40 | 3-(2-methyl-5-chloro-4-aminophenylimino)-1-oxo-4,5,6,7-tetrachloroisoindoline | 3-hydroxy-2-naphtho-m-nitroanilide | bordeaux |
| 41 | 3-(4'-aminobiphenyl-3,3'-dichloro-4-ylimino)-1-oxo-4,5,6,7-tetrachloroisoindoline | 3-hydroxy-2-naphtho-o-toluidide | reddish purple |
| 42 | 3-(4'-aminobiphenyl-3,3'-dichloro-4-ylimino)-1-oxo-4,5,6,7-tetrachloroisoindoline | 3-hydroxy-2-naphtho-m-xylidide | reddish violet |
| 43 | 3-(4-methyloxy-3-aminophenylimino)-1-oxo-4,5,6,7-tetrachloroisoindoline | 3-(4-methoxy-3-m-xylidide | purple |
| 44 | 3-(4-methoxy-3-aminophenylimino-1-oxo-4,5,6,7-tetrachloroisoindoline | 3-hydroxy-2-naphtho-p-phenetidide | purple |
| 45 | 3-(6-methyl-3-aminophenylimino)-1-oxo-4,5,6,7-tetrachloroisoindoline | 3-hydroxy-2-naphtho-p-phenetidide | reddish purple |
| 46 | 3-(6-methyl-3-aminophenylimino)-1-oxo-4,5,6,7-tetrachloroisoindoline | 3-hydroxy-2-naphtho-anilide | purplish red |
| 47 | 3-(4-aminophenylimino)-1-oxo-4,5,6,7-tetrachloroisoindoline | 3-hydroxy-2-naphtho-anilide | bordeaux |
| 48 | 3-(4-aminophenylimino)-1-oxo-4,5,6,7-tetrachloroisoindoline | 3-hydroxy-2-naphtho-o-anisidide | reddish purple |
| 49 | 3-(4-aminophenylimino)-1-oxo-4,5,6,7-tetrachloroisoindoline | 3-hydroxy-2-naphtho-5-chloro-o-toluidide | reddish purple |
| 50 | 3-(4-aminophenylimino)-1-oxo-4,5,6,7-tetrachloroisoindoline | 3-hydroxy-2-naphtho-m-xylidide | reddish purple |
| 51 | 3-(2,5-dichloro-4-aminophenylimino)-1-oxo-4,5,6,7-tetrachloroisoindoline | 3-hydroxy-2-naphtho-p-anisidide | reddish purple |
| 52 | 3-(2,5-dichloro-4-aminophenylimino)-1-oxo-4,5,6,7-tetrachloroisoindoline | 3-hydroxy-2-naphtho-o-phenetidide | reddish blue |
| 53 | 3-(2,5-dimethoxy-4-aminophenylimino)-1-oxo-4,5,6,7-tetrachloroisoindoline | 2-(3-hydroxy-2-naphthoylamino)-3'-methoxybenzofuran | purplish brown |
| 54 | 3-(3-aminophenylimino)-1-oxo-4,7-dichloroisoindoline | 3-hydroxy-2-naphthoanilide | reddish blue |
| 55 | 5-(2'-aminobiphenyl-2,5'-dichloro-2-ylimino)-1-oxo-4,5,6,7-tetrachloroisoindoline | 3-hydroxy-3-naphthoanilide | purplish red |
| 56 | 3-(5-aminoanthraquinone-1-ylimino)-1-oxo-4,5,6,7-tetrachloroisoindoline | 3-hydroxy-3-naphthoanilide | purplish brown |

EXAMPLE 57

3.7 Parts of a diazoamino compound having the formula

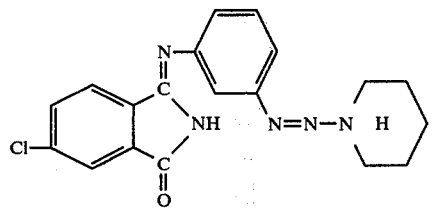

and 5.0 parts of bis[2'-hydroxy-3'-naphthoyl]-2-chloro-1,4-phenylenediamine were suspended in 700 parts of o-dichlorobenzene and the mixture was stirred at 90° to 100° C. and 20 parts of glacial acetic acid was added to the mixture. The mixture was gradually heated to 150° C. and was stirred at 150° C. for 30 minutes whereby a decomposition of a diazoamino compound and a coupling reaction were conducted to obtain a bluish brown pigment having the formula

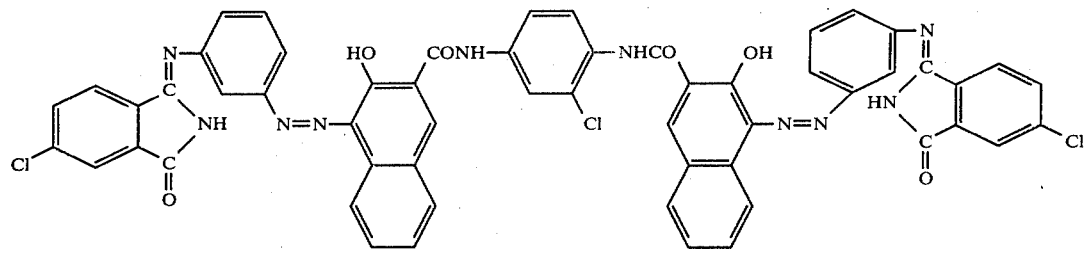

Various test results of characteristics of the resulting pigment and the known pigment (chlomophthalred B.R. (Reference A)) are shown in Table 4.

EXAMPLE 58

4.1 Parts of 3-(4-amino-5-chlorophenylimino)-1-oxo-4,5,6,7-tetrachloroisoindoline was suspended in 12 parts of glacial acetic acid and 3.7 parts of conc. hydrochloric acid was added and the mixture was stirred and then, 2.6 parts of water was added and the mixture was kept at 0° to 5° C. and 2.0 parts of 40% aqueous solution of sodium nitrite was added and the mixture was stirred at the same temperature for about 1 hour to obtain a pale yellow diazonium salt.

On the other hand, 1.9 parts of 3,3'-dimethyl-4,4'-bisacetoacetylamino-diphenyl was dissolved in 50 parts of water containing 2.5 parts of 30% aqueous solution of sodium hydroxide.

The solution was added dropwise to the diazonium salt with vigorously stirring. After the addition, the mixture was gradually heated to conduct a coupling reaction. The resulting product was heated at 95° to 100° C. for 1 hour and filtered without cooling it and then, washed with a hot water to obtain a reddish orange pigment having the formula

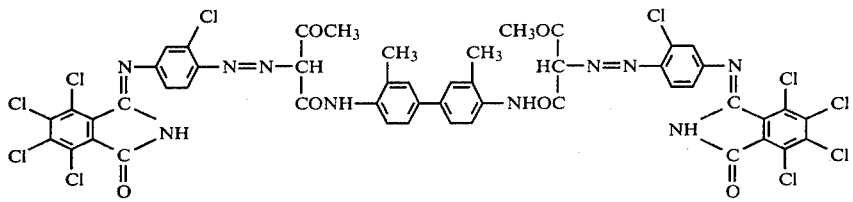

Various test results of characteristics of the resulting pigment and the known pigment (Parmanent yellow NCG: C.I. 20040 (Reference B) are shown in Table 4.

TABLE 4

| Example | Tinting strength | | | Solvent resistance | | | Weatherproofing property | | |
|---|---|---|---|---|---|---|---|---|---|
| | Invent | Ref. A | Ref. B | Invent. | Ref. A | Ref. B | Invent. | Ref. A | Ref. B |
| 57 | ◎ | ◎ | ◎ | ◎ | ◎ | ○ | ◎ | ○ | X |
| 58 | ◎ | ◎ | ◎ | ◎ | ◎ | ○ | ◎ | ○ | X |

Note:
◎ Excellent
○ Fair
X Inferior

EXAMPLE 59

3.75 Parts of 3-(4-aminophenylimino)-1-oxo-4,5,6,7-tetrachloroisoindoline was dissolved in 37.5 parts of dimethylformamide and 3.4 parts of conc. hydrochloric acid was added, and the mixture was stirred and kept at 0° to 5° C. and 2.0 parts of 40% aqueous solution of sodium nitrite was added and the mixture was stirred at the same temperature for 1 hour to obtain a pale yellow diazonium salt.

On the other hand, 2.1 parts of 1-(4-methoxyphenyl)-3-methyl-5-pyrazolone was dissolved into 42 parts of dimethylformamide and 4.3 parts of sodium acetate trihydrate was added. The mixture was kept at 10° C. and the diazonium salt was added dropwise and a coupling reaction was conducted to obtain a brilliant red azo pigment having the formula

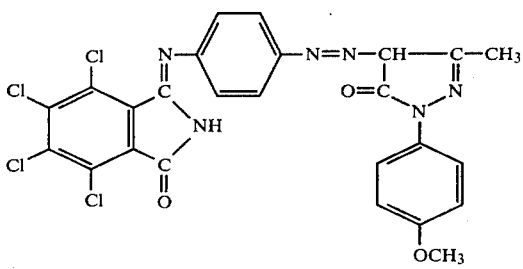

EXAMPLE 60

5.4 Parts of a diazoamino compound (produced by reacting piperidine with a diazonium salt of 3-(2,5-dichloro-4-aminophenylimino)-1-oxo-4,5,6,7-tetrachloroisoindoline in an alkaline medium) which has the formula

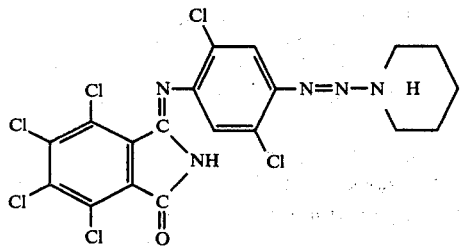

and 2.4 parts of 1-phenyl-3-carboxyethyl-5-pyrazolone were suspended in 250 parts of o-dichlorobenzene and the mixture was heated to 70° to 75° C. and 20 parts of glacial acetic acid was added. The mixture was stirred at 120° to 130° C. for 2 hours to decompose the diazoamino compound and a coupling reaction was conducted to obtain a reddish orange azo pigment having the formula

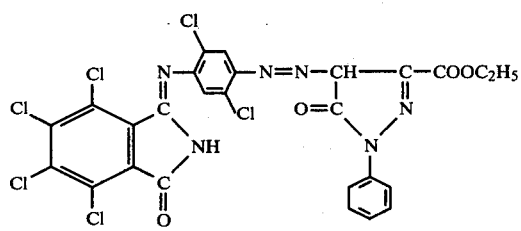

EXAMPLES 61 TO 101

In accordance with the process of Examples 59 and 60 except using the compounds having the formula (III) and the known coupling components, various azo pigments shown in Table 5 were prepared.

TABLE 5

| Example | Compound (III) | Coupling component | Color |
|---|---|---|---|
| 61 | 3-(4-aminophenyl-imino)-1-oxo-4,5,6,7-tetrachloroisoindoline | 1-phenyl-3-methyl-5-pyrazolone | orange |
| 62 | 3-(4-aminophenyl-imino)-1-oxo-4,5,6,7-tetrachloroisoindolone | 1-(2,4-dimethylphenyl)-3-methyl-5-pyrazolone | red |
| 63 | 3-(4-aminophenyl-imino)-1-oxo-4,5,6,7-tetrachloroisoindoline | 1-(2,5-dimethoxy-4-chlorophenyl)-3-methyl-5-pyrazolone | red |
| 64 | 3-(4-aminophenyl-imino)-1-oxo-4,5,6,7-tetrachloroisoindoline | 1-(4-chlorophenyl)-3-methyl-5-pyrazolone | orange |
| 65 | 3-(4-aminophenyl-imino)-1-oxo-4,5,6,7-tetrachloroisoindoline | 1-phenyl-3-carboxyethyl-5-pyrazolone | red |
| 66 | 3-(2,5-dichloro-4-aminophenylimino)-1-oxo-4,5,6,7-tetrachloroisoindoline | 1-phenyl-3-carbamide-5-pyrazolone | orange |
| 67 | 3-(2,5-dichloro-4-aminophenylimino)-1-oxo-4,5,6,7-tetrachloroisoindoline | 1-(4-methoxyphenyl)-3-carboxyethyl-5-pyrazolone | red |
| 68 | 3-(2,5-dichloro-4-aminophenylimino)-1-oxo-4,5,6,7-tetrachloroisoindoline | 1-(4-methoxyphenyl)-3-methyl-5-pyrazolone | red |
| 69 | 3-(2,5-dichloro-4-aminophenylimino)-1-oxo-4,5,6,7-tetrachloroisoindoline | 1-(2-chlorophenyl)-3-methyl-5-pyrazolone | orange |
| 70 | 3-(2,5 dimethoxy-4-aminophenylimino)-1-oxo-4,5,6,7-tetrachloroisoindoline | 1-phenyl-3-methyl-5-pyrazolone | red |
| 71 | 3-(2,5-dimethoxy-4-aminophenylimino)-1-oxo-4,5,6,7-tetrachloroisoindoline | 1-(4-methylphenyl)-3-methyl-5-pyrazolone | red |
| 72 | 3-(2-methyl-5-chloro-4-aminophenylimino)-1-oxo-4,5,6,7-tetrachloroisoindoline | 1-(2,5-dichlorophenyl)-3-methyl-5-pyrazolone | orange |
| 73 | 3-(2-methyl-5-chloro-4-aminophenylimino)-1-oxo-4,5,6,7-tetrachloroisoindolone | 1-(4-methylphenyl)-3-carboxyethyl-5-pyrazolone | red |
| 74 | 3-(6-methoxy-3-aminophenylimino)-1-oxo-4,7-dichloroisoindolone | 1-phenyl-3-carboxyethyl-5-pyrazolone | red |
| 75 | 3-(6-methoxy-3-aminophenylimino)-1-oxo-4,7-dichloroisoindoline | 1-(4-chlorophenyl)-3-carboxyethyl-5-pyrazolone | red |
| 76 | 3-(4'-aminobiphenyl-3,3'-dichloro-4-ylimino)-1-oxo-4,5,6,7-tetrachloroisoindoline | 1-(4-methoxyphenyl)-3-methyl-5-pyrazolone | reddish orange |
| 77 | 3-(2'-aminobiphenyl-2,5'-dichloro-2-ylimino)-1-oxo-4,5,6,7-tetrachloroisoindoline | 1-phenyl-3-methyl-5-pyrazolone | orange |
| 78 | 3-(5-aminoanthraquinone-1-ylimino)-1-oxo-4,5,6,7-tetrachloroisoindolone | 1-phenyl-3-methyl-5-pyrazolone | brownish red |
| 79 | 3-(4-aminonaphthalene-1-ylimino)-1-oxo-4,5,6,7-tetrachloroisoindoline | 1-phenyl-3-methyl-5-pyrazolone | red |
| 80 | 3-(4-aminophenylimino)-1-oxo-4,5,6,7-tetrachloroisoindoline | acetoaceto-o-chloroanilide | yellow |
| 81 | 3-(4-aminophenylimino)-1-oxo-4,5,6,7-tetrachloroisoindoline | acetoaceto-o-anisidide | reddish yellow |
| 82 | 3-(4-aminophenylimino)-1-oxo-4,5,6,7-tetrachloroisoindoline | acetoaceto-2,4-dimethoxyanilide | orange |
| 83 | 3-(3-aminophenylimino)-1-oxo-4,5,6,7-tetrachloroisoindoline | acetoaceto-o-toluidide | yellow |
| 84 | 3-(3-aminophenylimino)-1-oxo-4,5,6,7-tetrachloroisoindoline | acetoaceto-2,5-dimethoxy-4-chloroanilide | orange |
| 85 | 3-(3-chloro-4-aminophenylimino)-1-oxo-4,5,6,7-tetrachloroisoindoline | acetoaceto-2-methyl-5-chloroanilide | reddish yellow |
| 86 | 3-(3-chloro-4-aminophenylimino)-1-oxo-4,5,6,7-tetrachloroisoindoline | 1-phenyl-3-methyl-5-pyrazolone | reddish orange |
| 87 | 3-(4-aminophenylimino)-1-oxo-5,6-dichloroisoindoline | 1-phenyl-3-carboxyethyl-5-pyrazolone | red |
| 88 | 3-(4-aminophenylimino)-1-oxo-isoindoline | 1,4-bis(2'-hydroxy-3-naphthoylamino)-2-chlorobenzene | reddish brown |
| 89 | 3-(4-aminophenylimino)-1-oxo-isoindoline | 1,4-bis(2'40 -hydroxy-3-naphthoylamino)-2,5-dimethoxybenzene | reddish brown |
| 90 | 3-(2,5-dimethoxy-4-aminophenyl)-1-oxo-4,7-dichloroisoindoline | 1,4-bis(2'-hydroxy-3'-naphthanylamino)-benzene | brownish blue |
| 91 | 3-(3,3'-dichloro-4'-aminobiphenyl-4-ylimino)-1-oxo-isoindoline | 1,4-bis(2'-hydroxy-3'-naphthoylamino)-2-methylbenzene | bluish brown |
| 92 | 3-(4-aminophenylimino)-1-oxo-4,5,6,7-tetrachloroisoindoline | 1,4-diacetoacetylaminobenzene | reddish yellow |

TABLE 5-continued

| Example | Compound (III) | Coupling component | Color |
|---|---|---|---|
| 93 | 3-(4-aminophenylimino)-1-oxo-4,5,6,7-tetrachloroisoindoline | 1,4-diacetoacetylamino-2-chlorobenzene | reddish yellow |
| 94 | 3-(4-aminophenylimino)-1-oxo-4,5,6,7-tetrachloroisoindoline | 1,4-diacetoacetylamino-2,5-dimethylbenzene | orange |
| 95 | 3-(4-aminophenylimino)-1-oxo-4,5,6,7-tetrachloroisoindoline | 1,4-diacetoacetylamino-2,5-dichlorobenzene | reddish yellow |
| 96 | 3-(2-methyl-5-chloro-4-aminophenylimino)-1-oxo-4,5,6,7-tetrachloroisoindoline | 1,4-diacetoacetylamino-2-methyl-5-chlorobenzene | reddish yellow |
| 97 | 3-(2-methyl-5-chloro-4-aminophenylimino)-1-oxo-4,5,6,7-tetrachloroisoindoline | 1,4-diacetoacetylamino-2-methyl-5-methoxybenzene | orange |
| 98 | 3-(2-methyl-5-methoxy-4-aminophenylimino)-oxo-4,5,6,7-tetrachloroisoindoline | 4,4'-diacetoacetylamino-3,3'-dichlorodiphenyl | orange |
| 99 | 3-(2-methyl-5-methoxy-4-aminophenylimino)-oxo-4,5,6,7-tetra chloroisoindoline | 4,4'-diacetoacetylamino-3,3'-dimethoxydiphenyl | red |
| 100 | 3-(2,5-dichloro-4-aminophenylyl)-1-oxo-4,5,6,7-tetrachloro-isoindoline | 1,4-diacetoacetylamino-benzene | reddish yellow |
| 101 | 3-(2,5-dichloro-4-aminophenylyl)-1-oxo-4,5,6,7-tetrachloro-isoindoline | 1,4-diacetoacetylamino-2,5-dimethylbenzene | orange |

What is claimed is:

1. Azo pigments having the formula

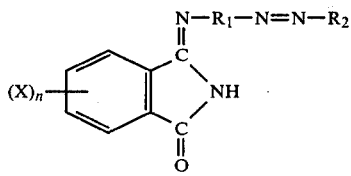

wherein X represents hydrogen or a halogen atom, n represents an integer of 1 to 4, $R_1$ represents a substituted or unsubstituted aromatic group, $R_2$ represents a moiety of a coupling component which has one coupling site and is selected from the group consisting of

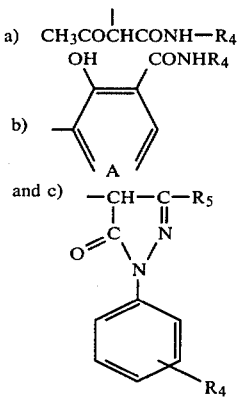

wherein $R_4$ represents phenyl, phthalimido or benzimidazolone group which can be substituted with a halogen atom, methyl, methoxy, ethoxy, nitro, carbamido, phenylcarbamoyl or acetylamino group, the A ring represents naphthalene ring, anthracene ring, anthrone ring, carbazole ring or dibenzofuran ring, and $R_5$ represents methyl, ethyl, carbomethoxy, carboethoxy or carbamido group.

2. Azo pigments of claim 1 wherein X represents chlorine atom and n is 4.

3. Azo pigments according to claim 1 wherein $R_2$ is a moiety of a coupling component having the formula

wherein $R_4$ represents phenyl, phthalimido or benzimidazolone group which can be substituted with a halogen atom, methyl, methoxy, ethoxy, nitro, carbamido, phenylcarbamoyl or acetylamino group.

4. Azo pigments according to claim 1 wherein $R_2$ is a moiety of a coupling component having the formula

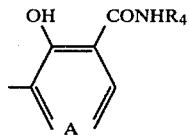

wherein $R_4$ represents phenyl, phthalimido or benzimidazolone group which can be substituted with a halogen atom, methyl, methoxy, etoxy, nitro, carbamido, phenylcarbamoyl or acetylamino group and A ring represents naphthalene ring, anthracene ring, anthrone ring, carbazole ring or dibenzofuran ring.

5. Azo pigments according to claim 1 wherein $R_2$ is a moiety of a coupling component having the formula

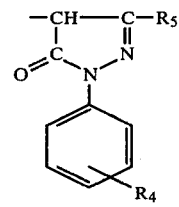

wherein $R_4$ represents phenyl, phthalimido or benzimidazolone group which can be substituted with a halogen atom, methyl, methoxy, ethoxy, nitro, carbamido, phenylcarbamoyl or acetylamino group and $R_5$ represents methyl, ethyl, carbomethoxy, carboethoxy or carbamido group.

6. Azo pigments according to claim 1 wherein $R_3$ is a moiety of a coupling component having the formula

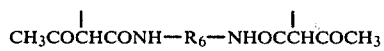

wherein $R_6$ represents a phenylene, biphenylene or naphthylene group which can be substituted with a halogen atom, methyl, methoxy or ethoxy group.

7. Azo pigments according to claim 1 wherein $R_3$ is a moiety of a coupling component having the formula

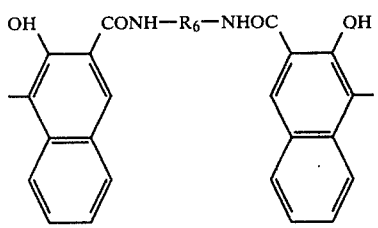

wherein $R_6$ represents a phenylene, biphenylene or naphthylene group which can be substituted with a halogen atom, methyl, methoxy or ethoxy group.

8. Azo pigments having the formula

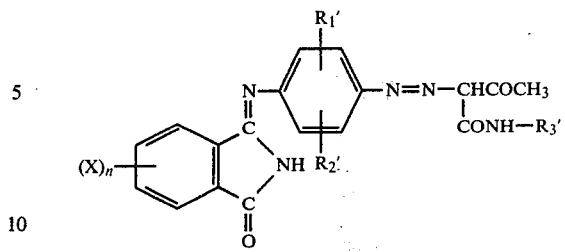

wherein X represents chlorine or hydrogen atom; n represents an integer of 1 to 4; $R_1$ and $R_2$ respectively represent nitro group, a $C_1$-$C_2$ lower alkyl group, a $C_1$-$C_2$ lower alkoxy group, hydrogen or halogen atom; and $R_3$ represents a substituted or unsubstituted aromatic ring.

9. Azo pigments according to claim 1, wherein X represents chlorine and n is 4.

10. Azo pigments having the following formula:

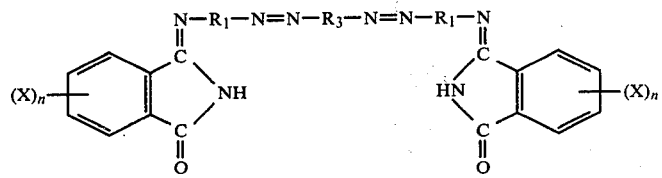

wherein X represents hydrogen or halogen atom; n represents an integer of 1 ro 4; $R_1$ represents a substituted or unsubstituted aromatic group; and $R_3$ represents a moiety of a coupling component which has two coupling sites.

* * * * *